Dec. 24, 1957    I. CORIN ET AL    2,817,753
BATTERY OPERATED CLOSET LIGHT
Filed July 26, 1955    3 Sheets-Sheet 1
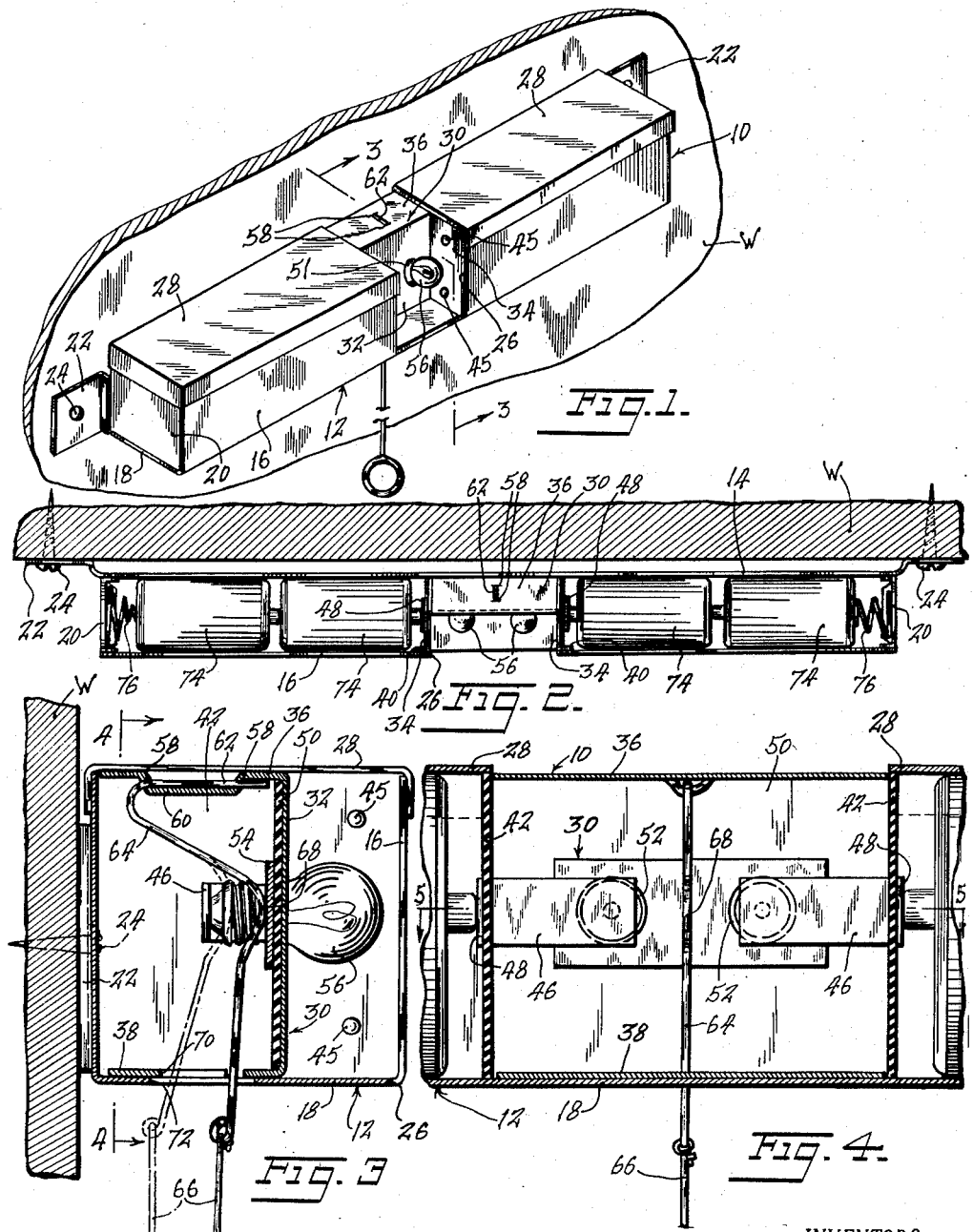
INVENTORS
IRVING CORIN
MORRIS CORIN
BY
ATTORNEY Dec. 24, 1957     I. CORIN ET AL     2,817,753
BATTERY OPERATED CLOSET LIGHT Filed July 26, 1955     3 Sheets-Sheet 2

INVENTORS
IRVING CORIN
MORRIS CORIN
BY
ATTORNEY

Dec. 24, 1957    I. CORIN ET AL    2,817,753
BATTERY OPERATED CLOSET LIGHT

Filed July 26, 1955    3 Sheets-Sheet 3

INVENTORS
IRVING CORIN
MORRIS CORIN
BY
ATTORNEY

United States Patent Office  2,817,753
Patented Dec. 24, 1957

2,817,753

BATTERY OPERATED CLOSET LIGHT

Irving Corin and Morris Corin, Brooklyn, N. Y.

Application July 26, 1955, Serial No. 524,532

7 Claims. (Cl. 240—10.6)

This invention relates to lighting fixtures, and more particularly has reference to a portable fixture which can be conveniently mounted in a closet, doorway, or similar enclosure, and, through the medium of a self-contained source of electricity such as a plurality of conventional flashlight batteries, be used as an illumination means for said enclosure.

Often, it is desirable to provide a light in a closet or similar enclosure, and ordinarily, this entails considerable expense, if the addition of the lighting outlet requires the services of an electrician in extending additional wiring through walls of the structure, connecting said wiring to a junction box, and mounting a lamp fixture in the ceiling or wall of the closet.

The present invention has as its main object the provision of a battery operated lighting fixtures which is so designed as to be readily connectable to a wall or ceiling with a minimum of difficulty, and, when mounted upon the associated supporting surface, will be seemingly a conventional light fixture tied in electrically with the regular electrical or wiring system of the house or other building.

A more specific object of the invention is to provide a battery operated lighting fixture for closets or similar enclosures which will be so designed as to facilitate the replacement of batteries, due to the provision of readily removable, simply designed battery covers on the battery-enclosing casing of the device.

Yet another object of importance is to form the device in such a manner as to facilitate its assembly in mass production manufacturing operations.

A further object of importance is to provide a simply designed closet light as described in which the lamp and switch supporting assembly of the fixture will be a self-contained, preassembled unit, readily assembled with the casing of the device to complete the construction thereof.

A further object of importance is to provide a simply designed switch mechanism which, by a simple pull upon a cord and a lateral movement of the cord after it has been pulled, will cause the lamps or bulbs of the device to be illuminated and to remain illuminated until such time as the cord is laterally shifted in a return direction.

Yet another object of importance is to incorporate a circuit in the device which will be so designed as to insure that at least one lamp bulb will remain illuminated, even should one or more batteries become exhausted and further, it is proposed to so design the construction as to cause one of the lamp bulbs to be capable of being energized even should the other lamp bulb burn out.

Still another object, in a second form of the invention, is to provide a battery operated closet light as described which will be so designed as to be automatically illuminated responsive to opening of the closet door, and automatically deenergized when the door is closed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a battery operated closet lighting fixture formed according to the present invention, a closet wall on which said fixture is mounted being illustrated fragmentarily.

Fig. 2 is a top plan view of the fixture with the covers removed.

Fig. 3 is an enlarged transverse sectional view on line 3—3 of Fig. 1, showing the combined lamp and switch assemblies, the switch rod being shown in its circuit-closing position in full lines, and in its circuit-opening or "off" position in dotted lines.

Fig. 4 is a fragmentary longitudinal sectional view on line 4—4 of Fig. 3, showing the lamp and switch assembly from the back.

Figure 5:
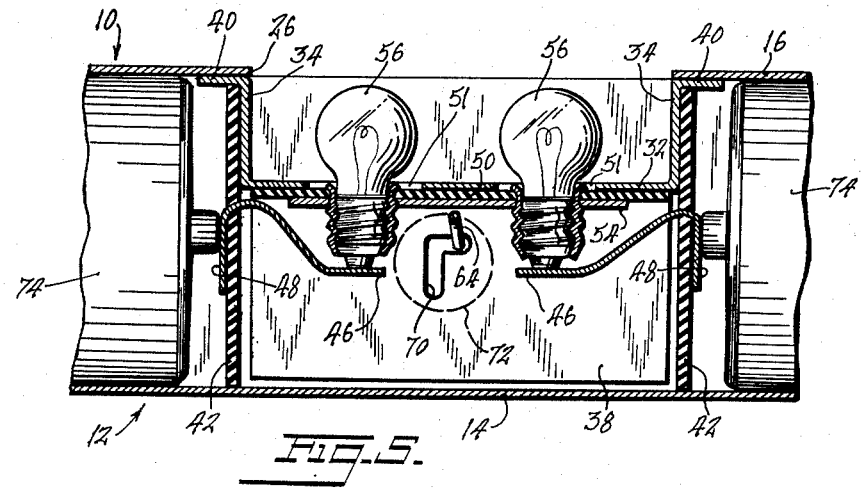
Fig. 5 is a fragmentary plan sectional view on line 5—5 of Fig. 4.
Figure 6:
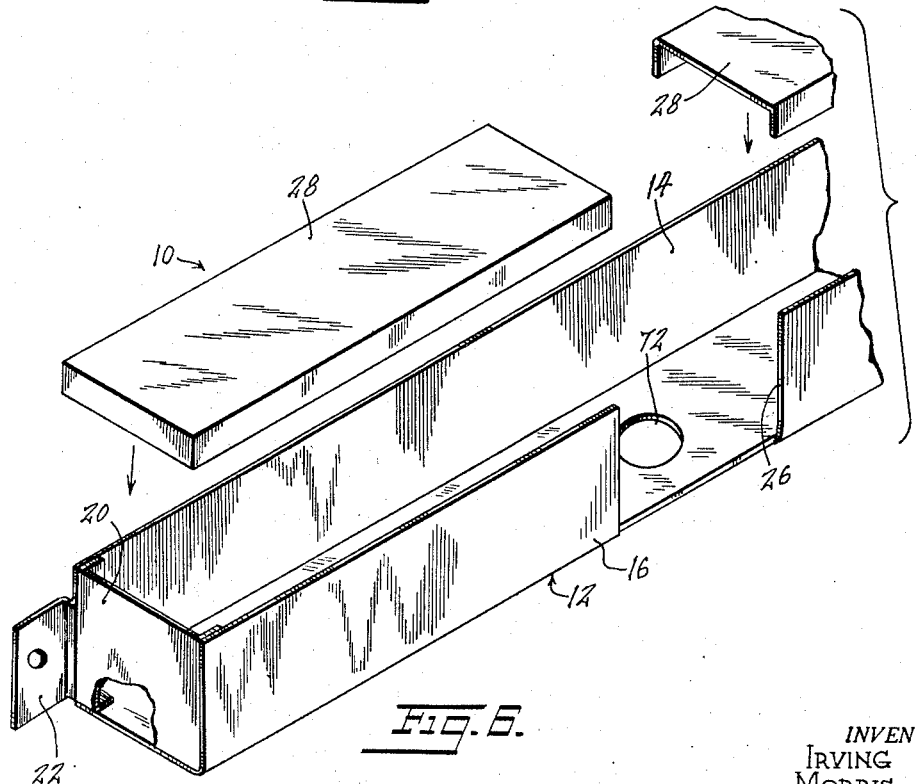
Fig. 6 is a fragmentary, exploded perspective view of the casing per se.
Figure 7:
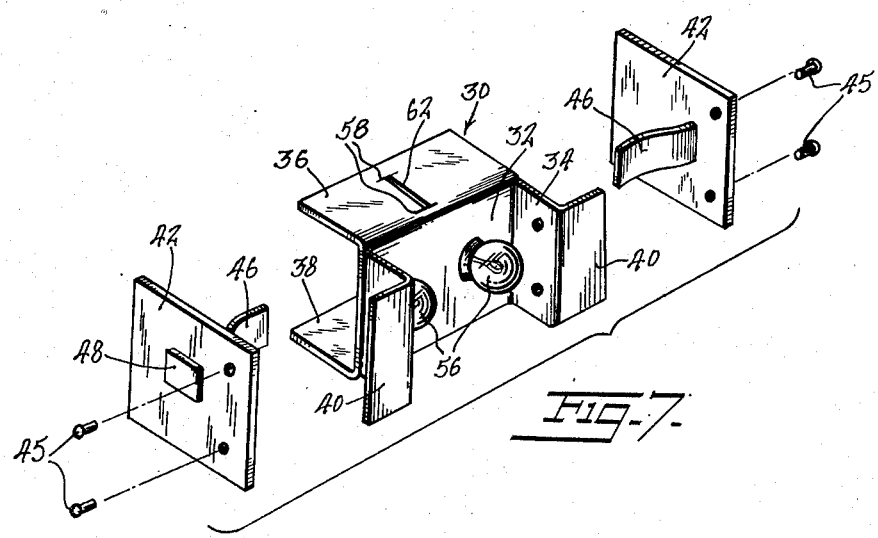
Fig. 7 is an exploded perspective view of the lamp and switch assembly per se.

In the form of the invention shown in Figs. 1–7, a closet wall has been designated by the reference letter W, and in Fig. 1, there is shown mounted on said wall the battery operated closet light 10 constituting the present invention.

The lighting fixture includes an elongated casing of rectangular cross section generally designated at 12, said casing including a main or body portion bent from a sheet metal blank to a channel-shaped cross section, so as to include side walls 14, 16, connected by a web portion 18. At its opposite ends, the main or body portion is closed by end walls 20. The end walls 20 are formed as pieces separate from the sheet metal blank used in forming the body portion, and have inwardly turned flanges at their sides spot welded or otherwise fixedly secured to the adjacent ends of the side walls 14, 16, said end walls also having inwardly turned bottom flanges fixedly secured to the web portion 18.

Integrally formed upon the opposite ends of side wall 14 are outwardly offset ears 22 having apertures receiving lag screws or similar fastening elements, whereby the casing is fixedly secured to wall W.

Medially between opposite ends of the casing, the wall 16 is cut away over its full width to provide a rectangular opening 26 through which the lamp bulbs of the fixture are adapted to project their beams when illuminated.

The casing includes a pair of oppositely but identically formed covers 28, each of said covers having side flanges extending the full lengths of the cover, and an end flange at one end. At their other or inner ends, the covers are unflanged, said inner ends of the covers terminating at the opposite sides of the opening 26 of wall 16.

The covers are adapted to frictionally engage the side and end walls of the casing, but if desired, the device can be manufactured in such a manner as to permit connection of the covers to the body portion of the casing by means of screws or similar fastening elements.

The termination of the inner ends of the covers at opposite sides of the opening 26 defines a space medially between opposite ends of the casing for a combined lamp and switch assembly generally designated at 30. The assembly 30 includes a lamp support plate 32, formed at opposite ends thereof with forwardly projecting ears 34, said assembly including rearwardly projecting flanges 36, 38 formed upon the longitudinal edges of plate 32. The plate 32, ears 34, and flanges 36, 38 can all be formed from a single blank of sheet metal material, and formed upon the forwardly projected edges of the ears are outwardly turned lips 40 adapted to engage against the inner surface of wall 16, said lips being spot welded or fixedly secured to the wall 16 in any other suitable manner.

The assembly 30 further includes transverse partitions 42, 42, formed of electrical insulation, such as fiber. The partitions are engaged against the outer surfaces of the ears 34, said ears being formed with spaced openings registering with similar openings formed in the partitions, to receive rivets 45 whereby the partitions are fixedly secured to the ears 34. The partitions project rearwardly beyond the lamp support plate 32 when the assembly is mounted in the casing, and in the mounted position of said assembly, it will be noted that the plate 32 is offset inwardly from the opening 26 formed in the front wall 16 of the casing.

Mounted upon the partitions 42 are spring contacts 46, of electrically conductive material, each of said contacts having one end portion projecting through slits formed in the partitions, said end portions being designated at 48 and lying against the outer surfaces of the partitions. The other end portions of the contacts extend toward one another in the space in back of the lamp support plate 32, for engagement, in a manner that will presently be described, with the base terminals of the lamp bulbs of the fixture.

A separator plate 50 of electrical insulation overlies the full area of the lamp support plate 32, in contact with the back surface of said plate 32. The plate 32 has side by side circular openings 51, of substantial diameter, and anchored at their inner ends to and projecting rearwardly from the separator plate 50 are lamp bulb sockets 52 concentric with the openings 51, but spaced inwardly from the edges of said openings, so as to be fully out of contact with the lamp support plate.

A bridging element 54 of electrical conducting material is formed with spaced openings, receiving the sockets 52, and is fixedly secured to the sockets in contact with the back surface of the separator plate 50.

A pair of conventional flashlight bulbs 56 are threaded into the sockets 52, and project forwardly from the lamp support plate 32, so as to cast their beams through the front opening 26 of the casing. When the bulbs are threaded inwardly within the sockets 52 to the maximum extent, their base terminals engage the free end portions of the spring contacts 46.

In the top flange 36 there are formed transversely spaced, short slits 58, and the material of the top flange 36 between the slits is struck downwardly, to receive a lateral extension 62 formed upon the upper end of a switch rod 64 of springable wire material having at its lower end an eye to which is attached a cord or string 66 depending from the fixture within the closet. Medially between its ends, the switch rod 64 has a forwardly offset portion 68 which, in the "on" position of the switch rod, engages the bridging element 54 medially between the opposite ends thereof.

In the bottom flange 38 there is formed a bayonet slot 70, and the bottom wall or web portion 18 of the casing is formed with a large circular opening 72 permitting exposure of the bayonet slot through the bottom of the casing, for shifting of the lower end of switch rod 64 between opposite ends of the bayonet slot without interference from the bottom wall or web portion 18.

In accordance with the invention, there are utilized two pair of flashlight batteries 74, mounted in the casing at opposite sides of the lamp and switch assembly 30. The outer batteries of said pairs are engaged by conical springs 76, which are held under compression between the batteries and the end walls of the casing, so as to force the batteries inwardly toward the lamp assembly 30, so that the center posts of the inner batteries of the pairs will be engaged with the anchored end portions 48 of the contacts 46. Access to the batteries is had with facility, by removal of the respective covers 28.

The casing is formed of an electrically conductive sheet metal material and in use of the device, and assuming that the closet light is turned off, the switch rod 64 will be in the dotted line position shown in Fig. 3. The switch rod, in this connection, is inherently spring tensioned to shift to said Fig. 3 dotted line position.

When it is desired to turn on the closet light, a pull on the string forwardly, that is to the right in Fig. 3, will swing the switch rod to the full line position of Fig. 3, and a lateral pull now exerted on the string will shift the free or lower end portion of the switch rod into the laterally extending part of the bayonet slot, to hold the switch rod in its "on" position, with its forwardly offset portion 68 in engagement with the bridging element 54.

When the switch rod is in the full line position of Fig. 3, a circuit will be closed to energize both lamp bulbs. The circuit closed will be as follows: from the center posts of the inner batteries of the respective pairs of of batteries, through the ends 48, contacts 46, through the central base terminals of the lamp bulbs, through the incandescent wires of the lamp bulbs, the threaded side walls of the lamp bulb bases, the sockets 52, bridging element 54, switch rod 64, flange 36, the lamp support plate 32, ears 34, the main portion of the casing, and springs 76 back to the source of power.

Figure 8:
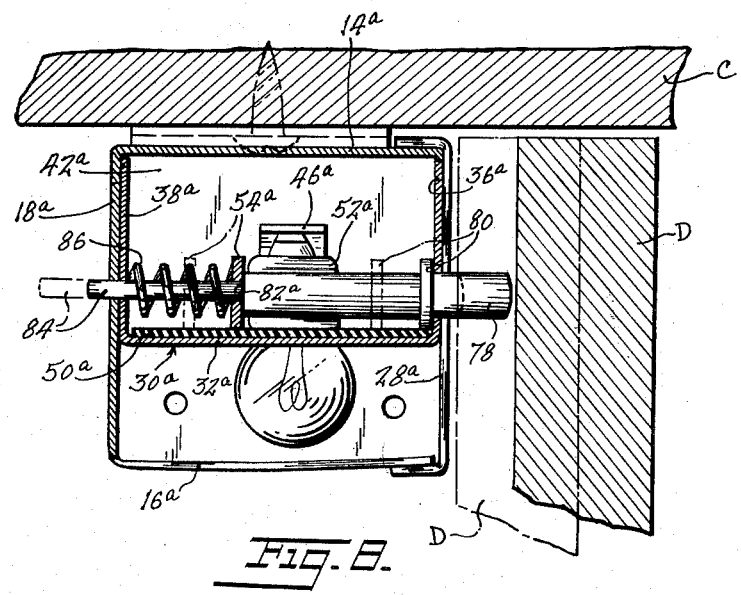
Fig. 8 is a transverse sectional view, in the same cutting plane as line 3—3 of Fig. 1, showing a modified construction.

In Fig. 8 there is shown a modified construction which is similar in all respects to that first illustrated and described, except for a slightly different construction of the combined lamp and switch assembly 30. In this form of the invention, the device is turned ninety degrees in a clockwise direction from its Fig. 3 position, for mounting upon the ceiling C of the closet, adjacent the door D thereof. The side wall 14ª of the casing is secured to the ceiling, with wall 16ª facing downwardly so as to become, in effect, the bottom wall, while web portion 18ª becomes one side wall, the other side wall being constituted by the covers 28ª of the device. The combined lamp and switch assembly has been designated at 30ª, and includes a lamp support plate 32ª having flanges 36ª, 38. As in the first form of the invention, transverse insulating partitions 42ª are provided at opposite ends of the lamp support plate, and are fixedly secured by rivets to the ears of said plate.

The contacts carried by the partitions 42ª have been designated at 46ª, and are similar in every respect to those of the first form of the invention.

In this form of the invention, the separator plate has been designated at 50ª, and mounted therein are vertically disposed sockets 52ª. The bridging element 54ª in this form of the invention, however, is not fixedly secured in contact with the separator plate 50ª. Rather, the bridging element is in engagement with the bulb socket 52ª only when the light is on. When the light is turned off, the bridging element 54ª is in the dotted line position shown in Fig. 8.

Instead of a switch rod, there is provided, in this form of the invention, a stem 78 of cylindrical formation, one end of which projects outwardly for engagement by the door D. Formed upon the stem 78 is a collar 80, adapted to engage against the flange 36ª. The stem, intermediate its ends, is formed with a circumferential shoulder 82ª, and rearwardly of said shoulder, has a reduced axial extension 84, the bridging element being apertured to slidably receive the extension. A coil spring 86 is circumposed about the extension 84, and is held under compression between the bridging element and the flange 38ª.

Normally, when the door is closed, said door will be in the dotted line position of Fig. 8, and the closing of the door will shift the stem in an axial direction to the left in Fig. 8, to the dotted line position thereof. This causes the bridging element to be shifted with the stem out of engagement with the lamp bulb sockets 52a, so that no circuit is closed through the device, and the bulbs will be deenergized.

Whenever the door is opened, however, the spring 86, tending to expand, shifts the bridging element 54a to the full line position of Fig. 8, and in this position, the element contacts the sockets 52. A circuit is thus closed including the source of power and the lamp bulbs, since current may now flow through the stem, bridging elements, and material of the casing. When the door is closed, of course, said circuit will not be closed, since the stem is out of contact with the lamp bulb sockets, and the bridging element is shifted out of engagement with said lamp bulb sockets.

In both forms of the invention there is the common characteristic wherein the burning out of one of the lamp bulbs will still leave the other bulb operating to illuminate the enclosure. This is so because of the twin circuit arrangement employed, making use of two pairs of batteries, either pair being included in a separate circuit and being adapted to illuminate one bulb due to the particular circuit arrangement employed. Further, this arrangement permits the light to operate efficiently even though one of the batteries may become exhausted, and in fact operation of one of the bulbs will not be stopped even if both batteries of one of the pairs of batteries become exhausted.

Further, in both forms of the invention there is the desirable common characteristic wherein replacement of any of the batteries can be effected with minimum difficulty, by removal of the associated battery cover. Still further, the construction lends itself to mass production manufacturing methods, since the combined lamp and switch assembly can be manufactured as a preassembled unit, and then assembled with the battery casing and covers.

In some commercial embodiments, instead of a pair of separate covers, there can be provided a single cover, extending the full length of the casing. This may be particularly adapted for the Fig. 8 form of the invention, to provide additional support for the slidable stem, but it will be understood that the one-piece cover can be used in both forms with equal facility.

While we have illustrated and described the preferred embodiments of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contact being carried by said partitions.

2. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contacts being carried by said partitions, the lamp assembly including a lamp support plate, said bulbs projecting outwardly from the lamp support plate and the casing having an opening in front of said lamp support plate through which the bulbs may cast their beams when energized, the lamp and switch assembly further including a separator plate of electrical insulation in contact with the lamp support plate, said sockets being mounted in the separator plate and the lamp support plate having openings, the edges of which are spaced outwardly from the sockets to prevent electrical contact between the sockets and the lamp support plate.

3. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contacts being carried by said partitions, the lamp assembly including a lamp support plate, said bulbs projecting outwardly from the lamp support plate and the casing having an opening in front of said lamp support plate through which the bulbs may cast their beams when energized, the lamp and switch assembly further including a separator plate of electrical insulation in contact with the lamp support plate, said sockets being mounted in the separator plate and the lamp support plate having openings, the edges of which are spaced outwardly from the sockets to prevent electrical contact between the sockets and the lamp support plate, the lamp support plate including flanges extending therefrom, said electrically conductive means being supported by one at least of said flanges.

4. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contacts being carried by said partitions, the lamp assembly including a lamp support plate, said bulbs projecting outwardly from the lamp support plate and the casing having an opening in front of said lamp support plate through which the bulbs may cast their beams when energized, the lamp and switch assembly further including a separator plate of electrical insulation in contact with the lamp support plate, said sockets being mounted in the separator plate and the lamp support plate having openings, the edges of which are spaced outwardly from the sockets to prevent electrical contact between the sockets and the lamp support plate, the lamp support plate including flanges extending therefrom, said electrically conductive means being supported by one at least of said flanges, and including a switch rod of springable material anchored at one end to said one flange and tensioned to normally shift to said other position, said rod being adapted for connection of a pull cord thereto for manual shifting of the rod against the spring tension thereof to said one position.

5. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contacts being carried by said partitions, the lamp assembly including a lamp support plate, said bulbs projecting outwardly from the lamp support plate and the casing having an opening in front of said lamp support plate through which the bulbs may cast their beams when energized, the lamp and switch assembly further including a separator plate of electrical insulation in contact with the lamp support plate, said sockets being mounted in the separator plate and the lamp support plate having openings, the edges of which are spaced outwardly from the sockets to prevent electrical contact between the sockets and the lamp support plate, the lamp support plate including flanges extending therefrom, said electrically conductive means being supported by one at least of said flanges, and including a switch rod of springable material anchored at one end to said one flange and tensioned to normally shift to said other position, said rod being adapted for connection of a pull cord thereto for manual shifting of the rod against the spring tension thereof to said one position, the other flange having a bayonet slot through which the other end of the switch rod extends, said bayonet slot including a lateral extension receiving the switch rod in said other position to hold the switch rod electrically connected with the bulb sockets.

6. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contacts being carried by said partitions, the lamp assembly including a lamp support plate, said bulbs projecting outwardly from the lamp support plate and the casing having an opening in front of said lamp support plate through which the bulbs may cast their beams when energized, the lamp and switch assembly further including a separator plate of electrical insulation in contact with the lamp support plate, said sockets being mounted in the separator plate and the lamp support plate having openings, the edges of which are spaced outwardly from the sockets to prevent electrical contact between the sockets and the lamp support plate, said lamp support plate including flanges, said electrically conductive means comprising an axially shiftable stem sliding in said flanges, said stem being spring loaded to shift in one direction to said one position, one end of the stem, in said one position, projecting outwardly from the casing for engagement by a door, whereby on movement of the door against the stem, the stem may be shifted axially against the restraint of the spring loading thereof to said other position.

7. A battery operated closet light comprising an electrically conductive casing, batteries mounted in said casing in electrical contact at one side thereof with the casing, and a combined lamp and switch assembly mounted in the casing including a support means, spaced electrically conductive bulb sockets carried by said means and electrically insulated from the casing, contacts engaged by the batteries at the other sides thereof, bulbs in the sockets having base terminals engaged with said contacts, and electrically conductive means carried by the support means for movement between opposite extreme positions and connected electrically to the casing in both of said positions, said last-named means in one of said positions being electrically connected with the bulb sockets to close a circuit for energizing said bulbs, and in its other position being electrically disconnected from the bulb sockets to break said circuit, said casing being of elongated formation and said batteries being mounted in opposite ends thereof, the casing including covers spaced longitudinally of the casing for the respective batteries, there being two groups of batteries, one at each end of the casing, each of said covers being adapted to extend over one of said groups, said combined lamp and switch assembly being mounted in the casing between said groups of batteries, and including spaced partitions of electrically insulative material extending transversely of the casing to separate the lamp assembly from the respective groups of batteries, said contacts being carried by said partitions, the lamp assembly including a lamp support plate, said bulbs projecting outwardly from the lamp support plate and the casing having an opening in front of said lamp support plate through which the bulbs may cast their beams when energized, the lamp and switch assembly further including a separator plate of electrical insulation in contact with the lamp support plate, said sockets being mounted in the separator plate and the lamp support plate having openings, the edges of which are spaced outwardly from the sockets to prevent electrical contact between the sockets and the lamp support plate, said lamp support plate including flanges, said electrically conductive means comprising an axially shiftable stem sliding in said flanges, said stem being spring loaded to shift in one direction to said one position, one end of the stem, in said one position, projecting outwardly from the casing for engagement by a door, whereby on movement of the door against the stem, the stem may be shifted axially against the restraint of the spring loading thereof to said other position, said electrically conductive means further including a bridging element carried by the stem and engaged with said sockets in said one position.

References Cited in the file of this patent
UNITED STATES PATENTS

| | | |
|---|---|---|
| 1,194,986 | Finkbeiner | Aug. 15, 1916 |
| 2,184,531 | Reinhardt | Dec. 26, 1939 |
| 2,198,525 | Burgess | Apr. 23, 1940 |
| 2,279,933 | Wells | Apr. 14, 1942 |
| 2,538,332 | Schaefer | Jan. 16, 1951 |
| 2,647,201 | Contento | July 28, 1953 |